(12) United States Patent
Lee et al.

(10) Patent No.: US 7,869,370 B2
(45) Date of Patent: Jan. 11, 2011

(54) PORTABLE INTERNET ANALYZER HAVING HANDOVER TEST FUNCTION

(75) Inventors: Cheoljin Lee, Incheon (KR); Jinsoup Joung, Seongnam (KR); Kyeongmin Ha, Seongnam (KR); Seunghwan Ji, Seongnam (KR); Junwan Park, Seoul (KR)

(73) Assignee: Innowireless Co., Ltd., Seongnam-Si (KR)

( * ) Notice: Subject to any disclaimer, the term of this patent is extended or adjusted under 35 U.S.C. 154(b) by 388 days.

(21) Appl. No.: 12/020,763

(22) Filed: Jan. 28, 2008

(65) Prior Publication Data

US 2008/0181120 A1  Jul. 31, 2008

(30) Foreign Application Priority Data

Jan. 29, 2007  (KR) ...................... 10-2007-0008928

(51) Int. Cl.
*H04L 12/26* (2006.01)
(52) U.S. Cl. ...................................... 370/241; 370/331
(58) Field of Classification Search ................. 370/241, 370/331; 455/23, 432.1, 436–442, 67.11, 455/115.1
See application file for complete search history.

(56) References Cited

U.S. PATENT DOCUMENTS

2002/0137514 A1* 9/2002 Mitsugi et al. .............. 455/436
2005/0030931 A1* 2/2005 Sung et al. .................. 370/342
2006/0003810 A1* 1/2006 Saikyo et al. ............... 455/566
2007/0002723 A1* 1/2007 Vare et al. ................... 370/203

FOREIGN PATENT DOCUMENTS

JP      2003-143055 A    5/2003
WO   WO 2006/099524 A1  9/2006

OTHER PUBLICATIONS

A Decision to Grant a Patent dated Sep. 2, 2010 issued by the Japanese Patent Office in a related Japanese Patent Application Serial No. 2008-017698 (3 pages).

* cited by examiner

*Primary Examiner*—Derrick W Ferris
*Assistant Examiner*—Mang Yeung
(74) *Attorney, Agent, or Firm*—Lucas & Mercanti, LLP

(57) ABSTRACT

Disclosed herein is a portable Internet analyzer (PIA) having a handover test function. The portable Internet analyzer includes a transmission unit, a reception unit, a switching unit, and a central control unit. The transmission unit encodes the various DownLink signals of a serving and/or target Base Station (stBS) using a preamble index, synthesizes the encoded signals, and sends the synthesized signals to a Portable Subscriber Station (PSS). The reception unit receives various UpLink (UL) signals from the PSS, and decodes the UL signals using the cell Parameters of the stBS. The switching unit selectively switches the transmission unit and the reception unit to the PSS. The central control unit generates various Media Access Control (MAC) messages to be sent to the PSS through the transmission unit in association with the handover test, analyzes handover test-related MAC messages received through the reception unit, and controls switching operation of the switching unit.

7 Claims, 6 Drawing Sheets

PORTABLE INTERNET ANALYZER HAVING HANDOVER TEST FUNCTION

CROSS-REFERENCE TO RELATED APPLICATIONS

This patent application claims the benefit of priority from Korean Patent Application No. KR10-2007-0008928 filed on Jan. 29, 2007, the entire disclosure of which is incorporated herein by reference.

BACKGROUND OF THE INVENTION

1. Field of the Invention

The present invention relates generally to a portable internet analyzer having a handover test function and, more particularly, to a portable Internet analyzer having a handover test function, which enables a handover test function to be effectively performed on a Portable Subscriber Station (PSS) using a single portable Internet analyzer.

2. Description of the Related Art

Currently, methods of wirelessly accessing the Internet include a method of accessing the Internet via a mobile telephone network based on a Wireless Application Protocol (WAP) or Wireless Internet Platform for Interoperability (WIPI) platform, and a method of accessing the Internet via a public wireless Local Area Network (LAN) or an Access Point (AP). However, the method using a mobile telephone network has fundamental limitations on use as a universal Internet access method due to the limited screen size, the limited input interface, and a billing system based on a measured rate system. Meanwhile, the method using a wireless LAN has fundamental problems in that it can only be used within a range having a radius of tens of meters around an AP, and in that it also realizes poor mobility. In order to overcome such problems, 'portable Internet service' (mobile WiMAX, or WiBro, which is a subset of mobile WiMAX and a Korean portable Internet standard) has been proposed as wireless Internet service capable of enabling high-speed Internet access at ADSL-level quality and cost, either when at rest or in intermediate-speed motion.

FIG. 1 is a diagram illustrating a method of allocating resources along a time axis and a frequency axis in Orthogonal Frequency Division Multiple Access (OFDMA). In general communication systems, since radio resources, that is, time and frequency, are limited, they must be allocated to a plurality of PSS users and used by them. Meanwhile, unlike existing CDMA-based systems and Wireless LAN (WLAN) systems, portable Internet systems employ OFDMA, in which a two-dimensional resource region, defined by the time axis and the frequency axis, is allocated to respective PSSs, as shown in FIG. 1.

FIG. 2 is a diagram showing the MAP structure of a portable Internet system. As shown in FIG. 2, in the portable Internet system, a plurality of pieces of data using the same channel coding method and modulation method is sent in a batch in order to improve efficiency. A set of data regions using the same channel coding method and modulation method is referred to as a "burst." The location and size information of each burst can be seen from the MAP information of a frame, as shown in FIG. 2. Here, the term 'frame' refers to a structured data sequence having a fixed duration, which is used in the Physical Layer (PHY) standard. A single frame may include both of a Downlink (hereinafter abbreviated as "DL"; a link from a Radio Access Station (PAS) to a PSS) sub-frame and an Uplink (hereinafter abbreviated as "UL"; a link from a PSS to an RAS) sub-frame.

Since the portable Internet system employs Time Division Duplexing (TDD), in which UL transmission and DL transmission share the same frequency but are performed at different times, essential information, including the length of a single frame and the ratio of a DL section to a UL section, is provided via MAP information. In order to dynamically allocate resources to PSSs, an RAS may send different MAPs through each frame. In this case, a MAP may be divided into DL_MAP, containing DL transmission information, and UL_MAP, containing UL resource access authority. Here, DL_MAP can be defined as a Media Access Control (MAC) layer message that defines the symbol offset and sub-channel offset of a burst divided and multiplexed along the subchannel and time axes on a downlink by an RAS, and the numbers of symbols and sub-channels, that is, allocated resources. Furthermore, a preamble, which is defined uniquely, is present in the first symbol of the DL subframe, and the preamble includes cell Identification (ID) information and segment information.

Meanwhile, the portable Internet system supports a handover function for preventing the connection of a PSS from being terminated in the case where a PSS moves from a wireless interface, provided by an RAS, to a wireless interface, provided by another RAS, as in a typical mobile communication system. The portable Internet standard provides for an article that conducts the test of whether a PSS effectively performs a handover. Handover is classified as break-before-make handover, in which service from a target base station (hereinafter simply abbreviated as a 'target BS') starts to be provided after connection with an existing serving base station (hereinafter simply abbreviated as a 'serving BS') has been released, or as make-before-break handover, in which service from a target BS starts to be provided before connection with an existing serving BS is released. Here, the 'serving BS' is a base station with which a PSS has recently registered during initial network entry or handover, and the 'target BS' is a base station with which a PSS will register at the end of handover.

Meanwhile, there may be a method of performing a test in an environment that is identical to an actual portable Internet environment with the assistance of a certain serving BS and a certain target BS in order to test the performance of handover on a PSS. This method has a problem in that it is impossible in practice to obtain assistance from an RAS from the point of view of the maintenance and management of RAS equipment. Additionally, there may be another method of performing a test indoors using two portable Internet analyzers. This method also has problems in that two portable Internet analyzers must be used, so that high equipment construction costs are incurred and the establishment of UL and DL synchronization and integrated control of the two analyzers are somewhat complicated.

SUMMARY OF THE INVENTION

Accordingly, the present invention has been made keeping in mind the above problems occurring in the prior art, and an object of the present invention is to provide a portable Internet analyzer having a handover test function, which enables a handover test function to be effectively performed on a PSS using a single portable Internet analyzer, so that test equipment construction costs can be reduced and the establishment of UL and DL synchronization and integrated control can be very easily performed.

In order to accomplish the above object, the present invention provides a portable Internet analyzer having a handover test function, including a transmission unit for encoding various DownLink (DL) signals of a serving Base Station (BS) or/and a target BS using a preamble index, including a cell ID assigned in advance in a form of a unique code in association with a handover test, synthesizing the encoded signals, and sending the synthesized signals to a Portable Subscriber Station (PSS); a reception unit for receiving various UpLink (UL) signals from the PSS in association with the handover test, and decoding the UL signals using the cell Parameters of the serving BS or/and target BS; a switching unit for selectively switching the transmission unit and the reception unit to the PSS for each of DL and UL sections of each frame; and a central control unit for generating various Media Access Control (MAC) messages to be sent to the PSS through the transmission unit in association with the handover test, analyzing handover test-related MAC messages received through the reception unit, and controlling switching operation of the switching unit.

In the above-described construction, the transmission unit may include a serving BS signal generation unit and target BS signal generation unit for implementing a physical layer algorithm, which includes encoding using the preamble indices and is performed in the serving BS and the target BS in association with the handover test, power/frequency adjustment units for separately adjusting power and frequency of the various DL signals output from the serving BS signal generation unit and the target BS signal generation unit, a mixer for mixing the DL signals output from respective power/frequency adjustment units, and a transmission control unit for implementing an algorithm of a MAC layer, which is a relatively upper layer, generating a MAC Protocol Data Unit (MAC PDU), generating an Uplink Channel Descriptor (UCD)/Downlink Channel Descriptor (DCD), including a UL cell ID, and other required messages, transferring the messages to the serving BS signal generation unit and the target BS signal generation unit, and controlling respective power/frequency adjustment units. The transmission unit may be further provided with a function of separately controlling Carrier to Interference Noise Ratios (CINRs) of various DL signals output from the serving BS signal generation unit and the target BS signal generation unit, or a function of separately controlling timing offsets between various DL, signals output from the serving BS signal generation unit and the target BS signal generation unit.

It is preferred that the serving BS signal generation unit and the target BS signal generation unit be implemented using Field Programmable Gate Arrays (FPGAs) or Digital Signal Processors (DSPs) and the transmission control unit be implemented using a DSP.

Meanwhile, the reception unit may include a serving BS signal analysis unit and target BS signal analysis unit for receiving various types of UL signals from the PSS and decoding the received UL, signals using cell Parameters assigned to the serving BS signal generation unit arid the target BS signal generation unit, and a reception control unit for controlling operation of the serving BS signal analysis unit and the target BS signal analysis unit and transferring the signals, decoded by the serving BS signal analysis unit and the target BS signal analysis unit, to the central control unit. The central control unit may be implemented using a typical personal computer, maintain synchronization between the transmission unit and the reception unit while bidirectionally communicating with the transmission control unit of the transmission unit and the reception control unit of the reception unit, perform a backbone function for the serving BS signal generation unit, the target BS signal generation unit, the serving BS signal analysis unit and the target BS signal analysis unit, generate messages to be sent through the transmission unit, generate UL-MAP information, transfer the UL-MAP information to the transmission unit and the reception unit, provides a user interface, which is configured to receive various handover test-related items set or input by a user, to the user, analyze the results of the decoding, received from the reception unit, and various types of data, received from the PSS, and notify the user of the results of the analysis.

BRIEF DESCRIPTION OF THE DRAWINGS

The above and other objects, features and other advantages of the present invention will be more clearly understood from the following detailed description, taken in conjunction with the accompanying drawings in which.

DESCRIPTION OF THE PREFERRED EMBODIMENTS

Figure 1:
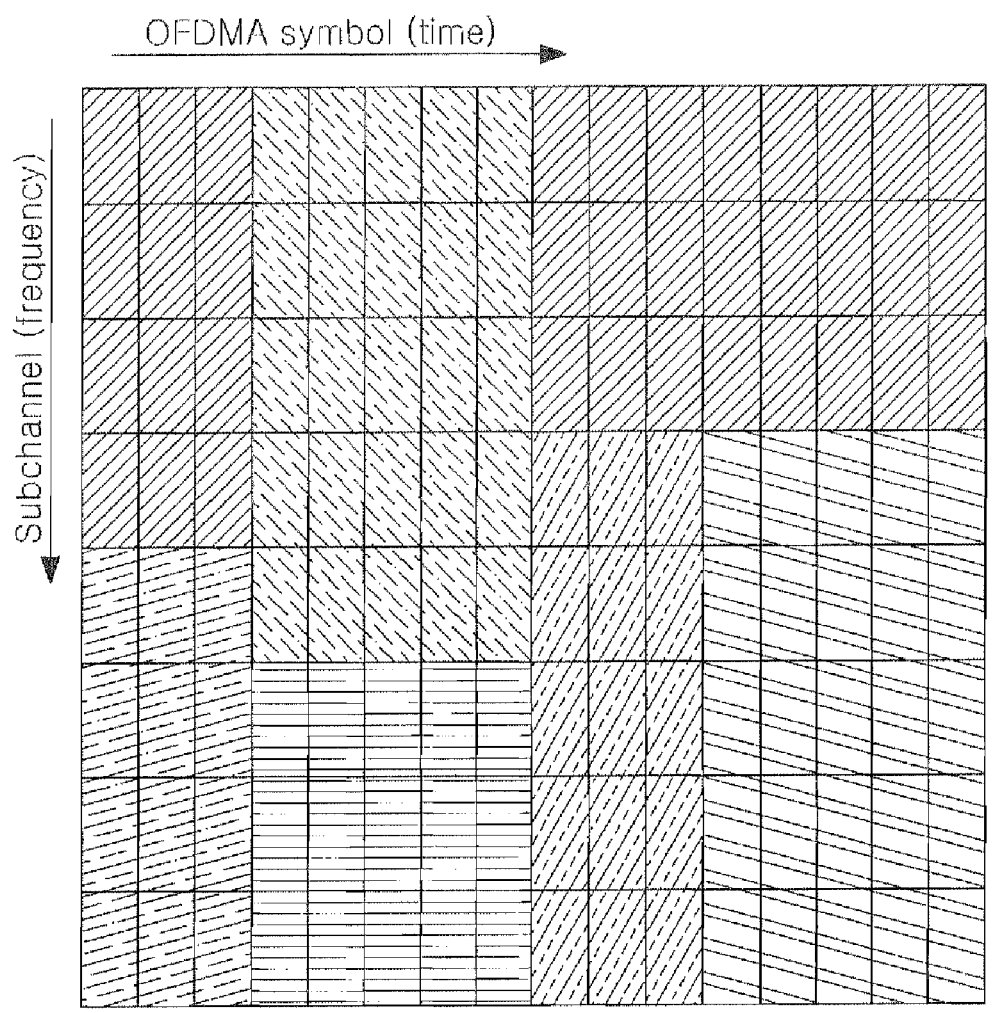
FIG. 1 is a diagram illustrating a method of allocating resources along a time axis and a frequency axis in OFDMA.
Figure 2:
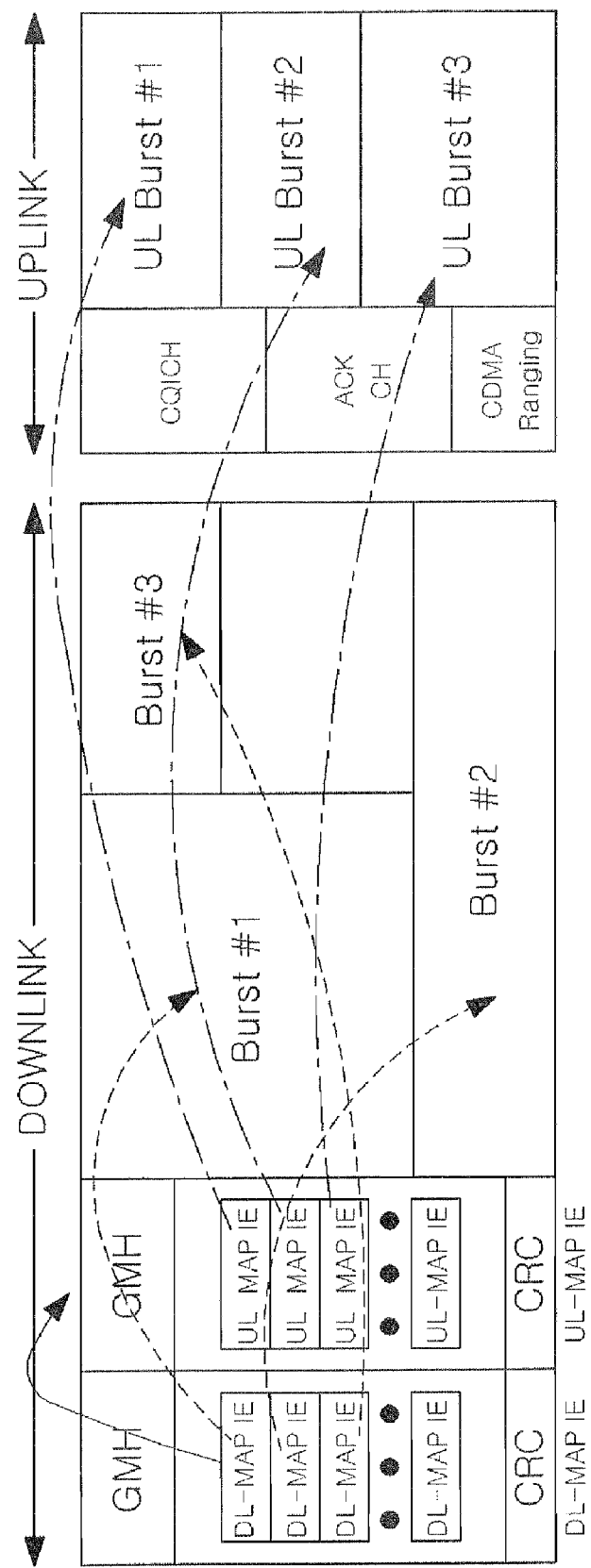
FIG. 2 is a diagram showing the MAP structure of a portable Internet system.

Reference now should be made to the drawings, in which, the same reference numerals are used throughout the different drawings to designate the same or similar components.

A portable Internet analyzer (WiMAX system analyzer), which is similar to Base Station Emulator (BSE), having a handover test function according to the present invention will be described in detail below with reference to the accompanying drawings.

Figure 3:
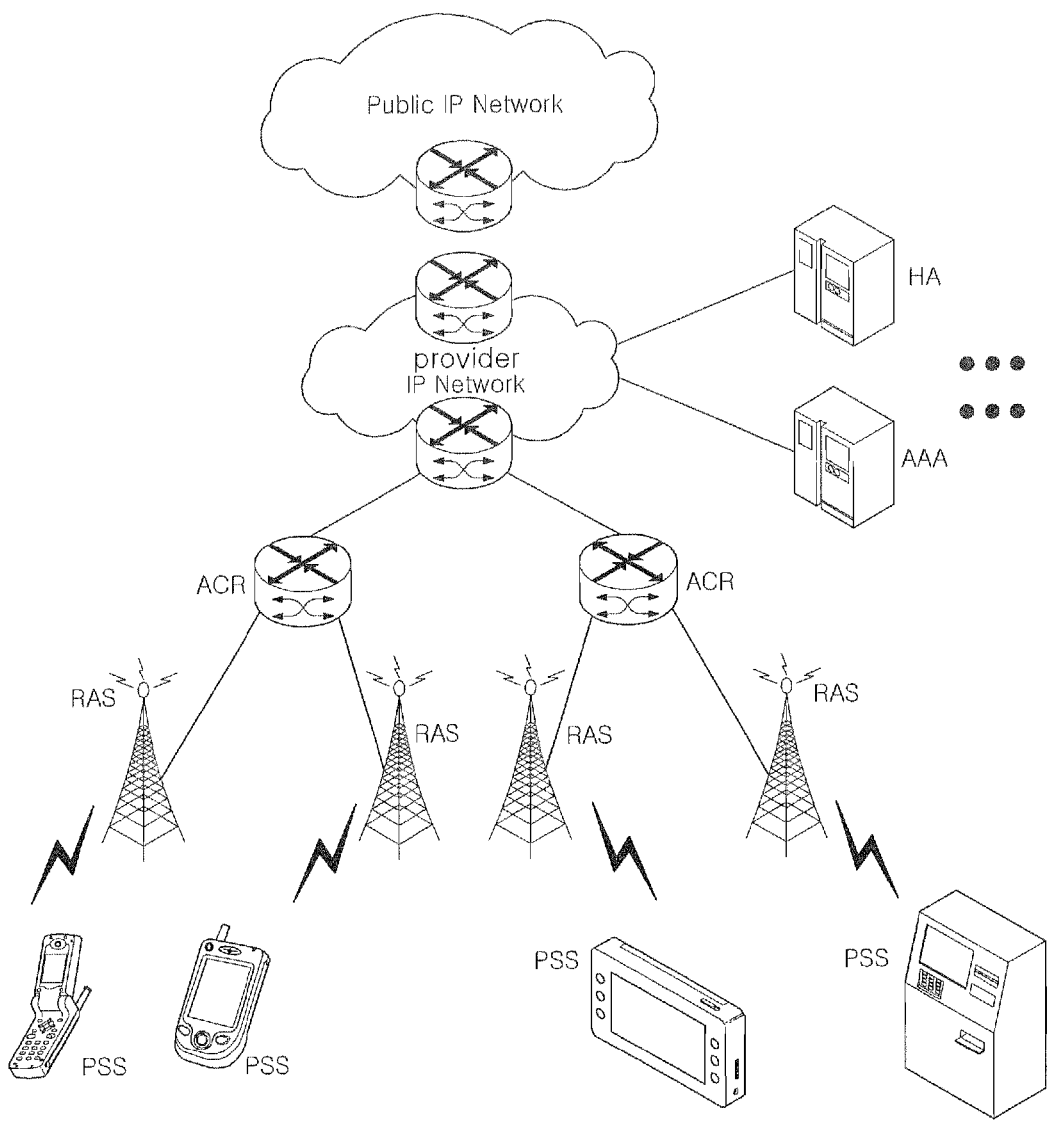
FIG. 3 is a diagram showing the network configuration of a typical portable Internet system.

FIG. 3 is a diagram showing the network configuration of a typical portable Internet system. As shown in FIG. 3, the basic network configuration of the portable Internet system includes Portable Subscriber Stations (PSSs), Radio Access Stations (RASs), and Access Control Routers (ACRs). In the above-described configuration, the PSSs perform the functions of portable Internet wireless access, IP-based service access, IP mobility, PSS/user authentication and security, the reception of muilticast service, and interworking with other networks. Meanwhile, the RASs perform the functions of portable Internet wireless access, wireless resource management and control, support for mobility handoff, authentication and security, the provision of QoS, downlink multicast, billing, the creation of statistical information, and the provision of notification. Finally, the ACRs perform the functions of IP routing, mobility management, authentication and security, QoS provision, IP muilticasting, the provision of billing service provision to a billing server, mobility control between the RASs under each of the ACRs, and resource management and control.

The following Table 1 shows principal parameters and essential requirements in the portable Internet system. As shown in Table 1, it can be seen that the portable Internet system, which is the object of analysis of the present invention, employs Time Division Duplexing (TDD) as a duplex operation method and OFDMA as a multiple access method.

TABLE 1

| Item | Method or value |
| --- | --- |
| duplexing method | TDD |
| multiple access method | OFDMA |
| system bandwidth | 8.7 MHz |
| transmission rate per subscriber | uplink minimum/maximum 128 Kbps/1 Mbps downlink minimum/maximum 512 Kbps/3 Mbps |
| frequency reuse coefficient | 1 |
| frequency efficiency | maximum frequency efficiency: downlink/uplink (6/2) average frequency efficiency: downlink/uplink (2/1) |
| handoff | inter-cell handoff within RAS, inter-RAS handoff, inter-frequency handoff: 150 ms |
| mobility | maximum of 60 km/h |
| service coverage | pico-cell: 100 m micro-cell: 400 m macro-cell: 1 km |

The following Table 2 shows the basic parameters of OFDMA for a Partial Usage of Sub-Channel (PUSC) diversity sub-channel, which is designated as an essential implementation option in the portable Internet system.

TABLE 2

| Parameter | Parameter value |
| --- | --- |
| system bandwidth | 8.75 MHz |
| sampling frequency ($F_s$) | 10 MHz |
| sampling interval ($1/F_s$) | 100 ns |
| FFT size ($N_{FFT}$) | 1024 |
| number at subcarriers used | 840 |
| number of data subcarriers | 720 |
| number of pilot subcarriers | 120 |
| subcarrier frequency interval | 9.765625 MHz |
| effective symbol time ($T_b = 1/\Delta f$) | 102.4 μs |
| CP time ($T_g = T_b/8$) | 12.8 μs |
| OFDMA symbol time ($T_s = T_b + T_g$) | 115.2 μs |
| TDD frame length | 5 ms |

As shown in Table 2, it can be seen that, in the portable Internet, the length of a single TDD frame is 5 ms and symbol time is 115.2 μs.

Figure 4:
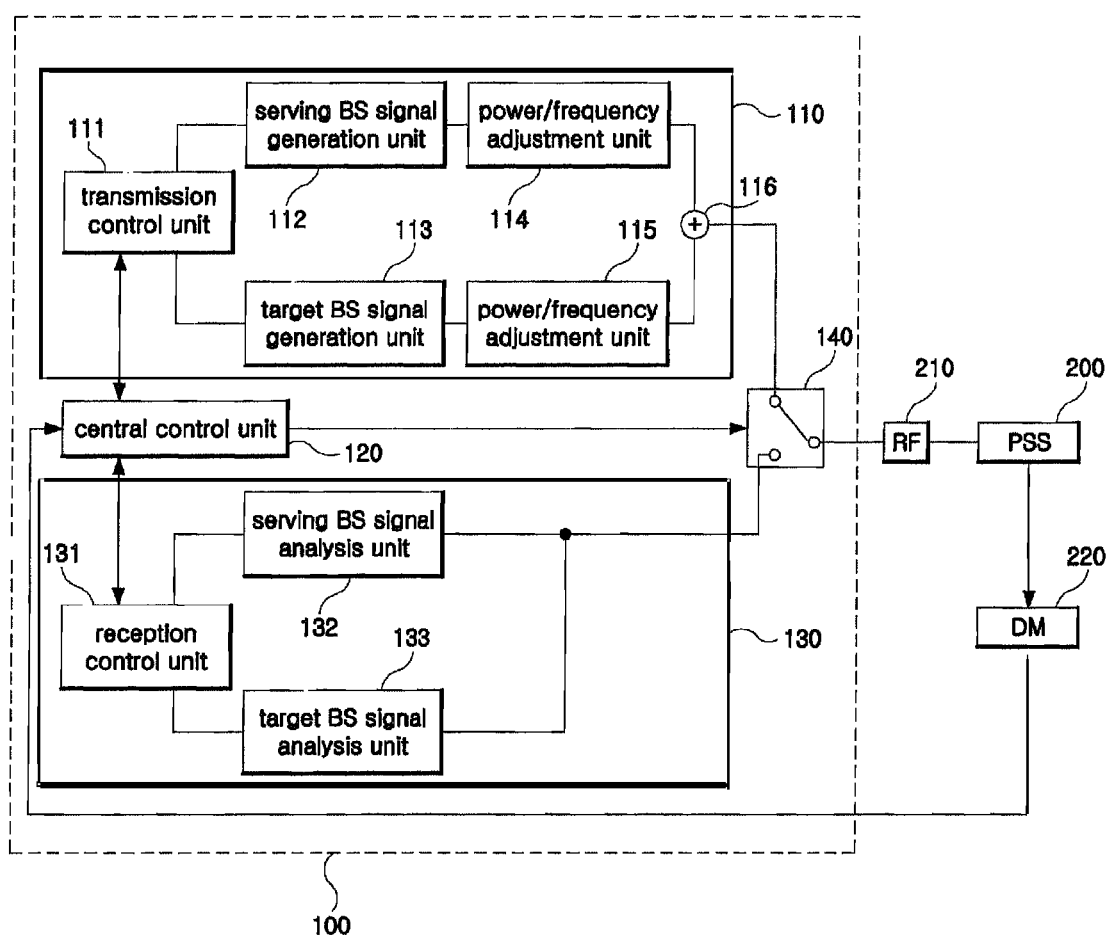
FIG. 4 is a block diagram of a portable Internet analyzer having a handover test function according to an embodiment of the present invention.

FIG. 4 is a block diagram of a portable Internet analyzer 100 having a handover test function according to an embodiment of the present invention. As shown in FIG. 4, the portable Internet analyzer 100 according to the present embodiment of the present invention may include a transmission unit 110 for encoding various DL signals of a serving Base Station (BS) or/and a target BS using a preamble Index, including a cell ID assigned in advance in the form of a unique code in association with a handover test, synthesizing the encoded signals, and sending the synthesized signals to a PSS, a reception unit 130 for receiving various UL signals (which will be described below) from the PSS 200 in association with the handover test and decoding the received UL signals using the cell. Parameters of the serving BS or/and target BS, a switching unit 140 for selectively switching the transmission unit 110 and the reception unit 130 to the PSS 200 for each of the DL and UL sections of each frame, and a central control unit 120 for generating various types of MAC messages to be sent to the PSS 200 through the transmission unit 110 in association with the handover test, analyzing handover test-related MAC messages received from the reception unit 130, and controlling the switching unit 140.

In the above construction, the transmission unit 110, in turn, includes a serving BS signal generation unit 112 and target BS signal generation unit 113 for implementing a physical layer algorithm, which is performed in the serving BS and the target BS in association with a handover test, power/frequency adjustment units 114 and 115 for separately adjusting the power and frequency of various DL signals output from the serving BS signal generation unit 112 and the target BS signal generation unit 113, a mixer 116 for mixing DL signals output from respective power/frequency adjustment units 114 and 115, and a transmission control unit 111 for implementing the algorithm of a MAC layer, which is a relatively upper layer, generating a MAC Protocol Data Unit (MAC PDU), generating an Uplink Channel Descriptor (UCD)/Downlink Channel Descriptor (DCD), including a UL cell ID, and other required messages, transferring the messages to the serving BS signal generation unit 112 and the target BS signal generation unit 113, and controlling respective power/frequency adjustment units 114 and 115. In this construction, the serving BS signal generation unit 112 and the target BS signal generation unit 113 chiefly perform simple tasks requiring very short processing times, and thus they may be implemented using Field Programmable Gate Arrays (FPGAs) or Digital Signal Processors (DSPs) that are suitable for such tasks. The transmission control unit 111 may be implemented using a DSP that is suitable for rapid operation.

Meanwhile, the reception unit 130 may include a serving BS signal analysis unit 132 and target BS signal analysis unit 133 for receiving various types of UL signals from the PSS 200 and decoding the received UL signals using cell Parameters assigned to the serving BS signal generation unit 112 and the target BS signal generation unit 113, and a reception control unit 131 for controlling the operation of the serving BS signal analysis unit 132 and the target BS signal analysis unit 133 and transferring the signals, decoded by the serving BS signal analysis unit 132 and the target BS signal analysis unit 133, to the central control unit 120. Here, the serving BS signal analysis unit 132 and the target BS signal analysis unit 133 may be implemented using FPGAs or DSPs, while the reception control unit 131 may be implemented using a DSP.

The central control unit 120 may be implemented using a typical personal computer. The central control unit 120 maintains synchronization between the transmission unit 110 and the reception unit 130 while bidirectionally communicating with the transmission control unit 111 of the transmission unit 110 and the reception control unit 131 of the reception unit 130, performs a backbone function for the serving BS signal generation unit 112, the target BS signal generation unit 113, the serving BS signal analysis unit 132 and the target BS signal analysis unit 133, generates messages to be sent through the transmission unit 110, generates UL-MAP information, and transfers the UL-MAP information to the transmission unit 110 and the reception unit 130. Additionally, the central control unit 120 provides a user interface, which is configured to receive various handover test-related items set or input by a user, to the user, analyzes the decoding results, received from the reception unit 130, and various types of data, received from the PSS 200, and notifies the user of the results of the analysis. For this purpose, the central control unit 120 connects with the PSS 200 through the Diagnostic Monitoring (DM) port 220 of the PSS 200 via a wired connection. Meanwhile, the switching unit 140 may be implemented using a typical electronic switch. The fixed contact of the switching unit 140 is connected to the PSS 200 through the RF Radio Frequency terminal 210, while the two movable contacts of the switching unit 140 are connected to the transmission unit 110 and the reception unit 130, respectively.

In the above construction, the serving BS signal generation unit 112 and the target BS signal generation unit 113 are assigned two different preamble indices (cell IDs and segments) so as to distinguish them from each other, and the serving BS signal analysis unit 132 and the target BS signal analysis unit 133 decode received UL signals using the cell Parameters assigned to the serving BS signal generation unit 112 and the target BS signal generation unit 113.

Figure 5:
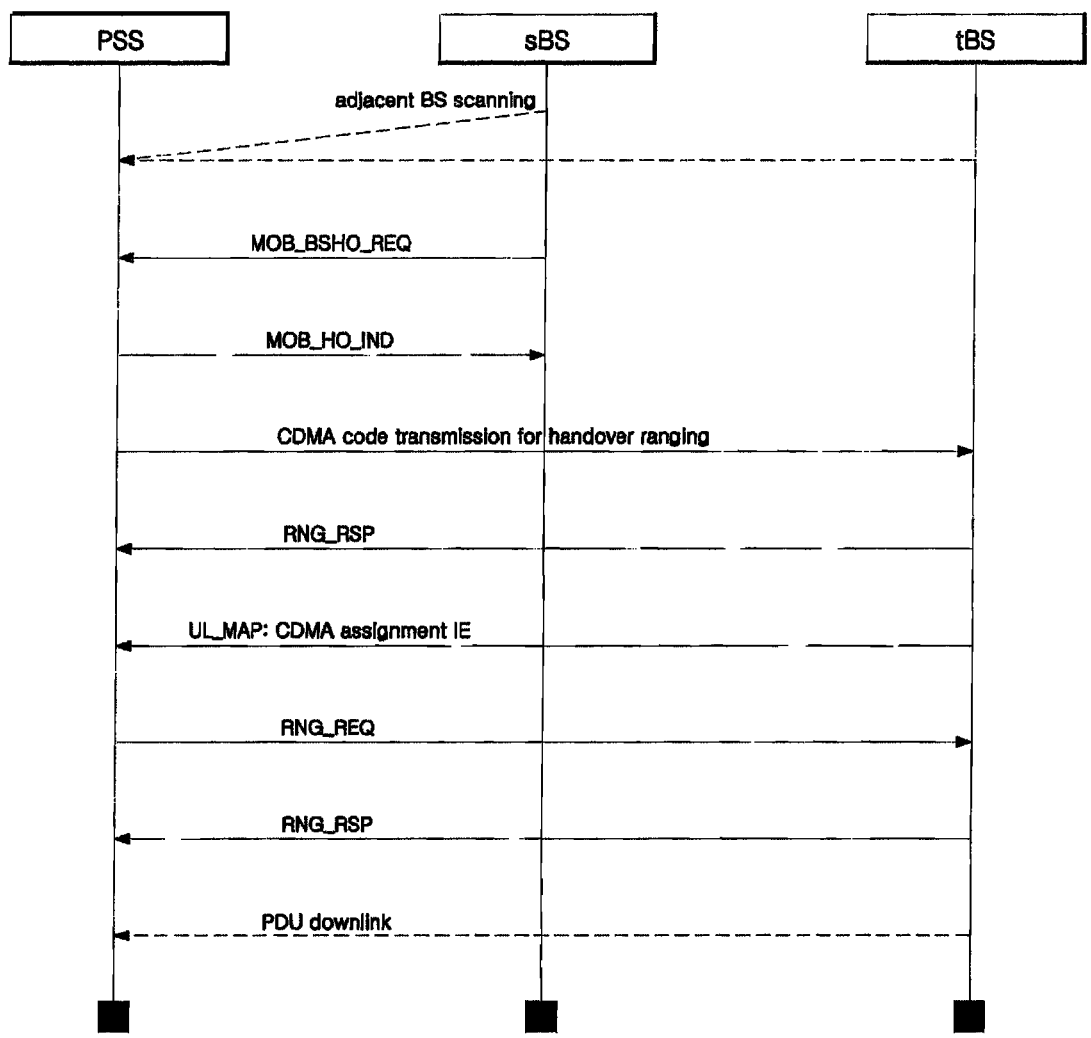
FIG. 5 is a call flow diagram showing a handover test procedure that is performed at the request of an RAS.

FIG. 5 is a call flow diagram showing a handover test procedure that is performed at the request of an RAS. The generation of DL signals in the serving BS sBS and the generation of DL signals in the target BS tBS may be respectively performed in the serving BS signal generation unit 112 of the portable Internet analyzer 100 and in the target BS signal generation unit 113 of the portable Internet analyzer 100, and the reception and decoding of UL signals in the serving BS sBS and the reception and decoding of UL signals in the target BS tBS may be respectively performed in the serving BS signal analysis unit 132 of the portable Internet analyzer 100 and in the target BS signal analysis unit 133 of the portable Internet analyzer 100. Furthermore, the backbone may be realized by the central control unit 120 As shown in FIG. 5, the PSS scans adjacent BSs at predetermined intervals This may be realized by receiving MOB_NBR_ADV messages that the serving BS sBS and the target BS tBS send to the PSS, which identifies a network and tries initial network entry or handover, at predetermined intervals of, for example, 30 seconds, in order to determine the characteristics of adjacent BSs (a target BS)

Thereafter, the serving BS sBS exchanges handover-related messages with an adjacent BS that is specified in a MOB_BSHO-REQ message (which will be described later), that is, the target BS tBS, via backbone, determines a suitable recommended BS list (in this case, a target BS tBS) using its own algorithm, and sends the MOB_BSHO-REQ message to the PSS Here, the MOB_BSHO-REQ message includes the BS_ID of the target BS tBS and a preamble index Preamble Index.

Thereafter, if there is no great change in the air environment at the time at which the MOB_BSHO-REQ message is received, the PSS finally decides to perform handover and then notifies the serving BS sBS of the decision to perform handover by sending a MOB_HO-IND message, including a target BS-ID, to the serving BS sBS. Thereafter, after sending the MOB_HO-IND message, the PSS releases wireless connection with the serving BS sBS and attempts to reconnect with the target BS tBS. Meanwhile, the serving BS sBS, which has received the MOB_HO-IND message, notifies the target BS tBS, specified in the MOB_HO-IND message, of the handover via the backbone. Thereafter, the PSS is assigned UL resources capable of sending an RNG-REQ message by the target BS tBS through code division multiple access code ranging.

Thereafter, the target BS tBS, having received the RNG-REQ message, acquires the context of the PSS and checks the authentication information of the PSS from the serving BS sBS, specified in the message, through the backbone. The target BS tBS, having determined that the PSS in question is a normal PSS, assigns system resources to the PSS and then responds by sending the RNG-RSP message. Thereafter, the target BS tBS starts to send DL traffic to the PSS.

Figure 6:
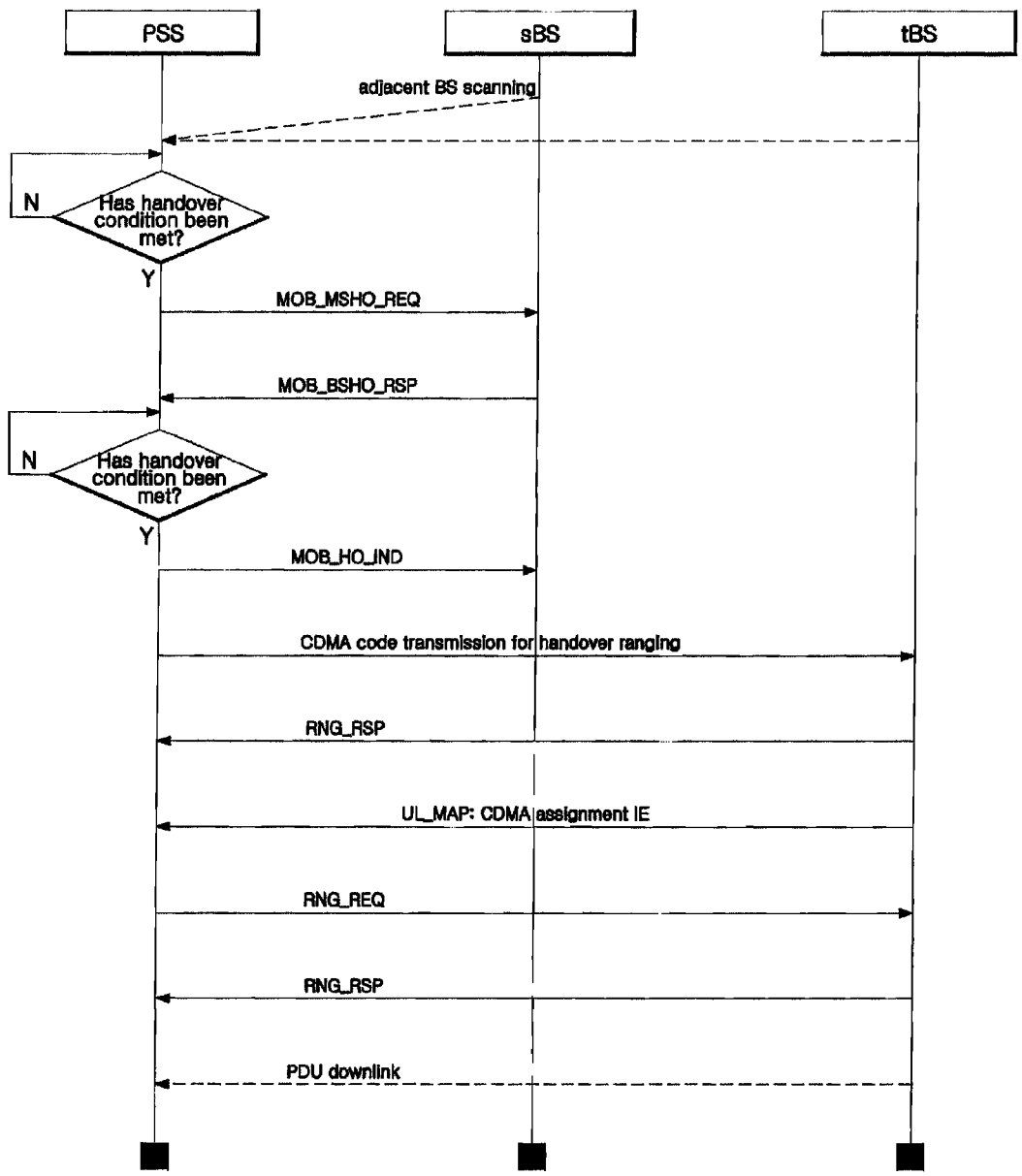
FIG. 6 is a call flow diagram showing a handover test procedure that is performed at the request of a PSS.

FIG. 6 is a call flow showing a handover test procedure that is performed at the request of the PSS. The generation of DL signals in the serving BS sBS and the generation of DL signals in the target BS tBS may be respectively performed in the serving BS signal generation unit 112 of the portable Internet analyzer 100 and in the target BS signal generation unit 113 of the portable Internet analyzer 100, and the reception and decoding of UL signals in the serving BS sBS and the reception and decoding of UL signals in the target BS tBS may be respectively performed in the serving BS signal analysis unit 132 of the portable Internet analyzer 100 and in the target BS signal analysis unit 133 of the portable Internet analyzer 100. Meanwhile, the backbone may be embodied by the central control unit 120. As shown in FIG. 6, the PSS scans adjacent BSs at predetermined time intervals. This may be performed by receiving MOB_NBR_ADV messages sent by the serving BS sBS and the target BS tBS to the PSS, which identifies a network and looks for initial network entry and handover, at predetermined intervals of, for example, 30 seconds, in order to determine the characteristics of adjacent BSs (a target BS). Such a MOB_NBR_ADV message may include a time/frequency synchronization identifier and a DCD/UCD reference identifier. In this process, the transmission control unit 111 enables the PSS to determine that a handover condition has been fulfilled by decreasing the intensity of the output signal of the serving BS signal generation unit 112 and increasing the intensity of the output signal of the target BS signal generation unit 113 through the power/frequency adjustment units 114 and 115.

Thereafter, the PSS determines whether the handover condition has been met, and sends a MOB_MSHO-REQ message to the serving BS sBS if the handover condition has been met. Whether the handover condition has been met may be determined, for example, by comparing the intensity of a signal, received from the serving BS, with the intensity of a signal, received from the target BS. Accordingly, the central control unit 120 of the portable Internet analyzer 100 can appropriately adjust power, output from the serving BS signal generation unit 112 and the target BS signal generation unit 113, by controlling the power/frequency adjustment units 114 and 115 at this time.

Thereafter, the serving BS sBS exchanges handover-related information with an adjacent BS, specified in the MOB_MSHO-REQ message, that is, a target BS tBS, via the backbone. Thereafter, the serving BS sBS determines a suitable recommended BS, that is, a target BS tBS, using its own algorithm, and responds to the PSS via a MOB_BSHO-RSP message.

Meanwhile, if the air environment is not considerably changed at the time at which the MOB_BSHO-RSP message, including information about a recommended BS information, that is, a target BS tBS, is received after the time at which the MOB_MSHO-REQ message was sent, the PSS finally decides to perform handover and then notifies the serving BS sBS of the decision to perform handover by sending a MOB_HO-IND message, including a target BS-ID, to the serving BS sBS. After sending the MOB_HO-IND message as described above, the PSS releases wireless connection with the serving BS sBS and attempts to reconnect with the target BS tBS. Meanwhile, the serving BS sBS that has received the MOB_HO-IND message notifies the target BS tBS, specified in the MOB_HO-IND message, of handover via the backbone. Thereafter, the PSS is assigned UL resources capable of transmitting an RNG-REQ message by the target BS tBS through Code Division Multiple Access Code Ranging.

Thereafter, the target BS tBS, having received the RNG-REQ message, acquires the context of the PSS and checks the authentication information of the PSS from the serving BS sBS, specified in the message, through the backbone. The target BS tBS, having determined that the PSS in question is a normal PSS, assigns system resources to the PSS and then responds by sending the RNG-RSP message. Thereafter, the target BS tBS starts to send DL traffic to the PSS.

Meanwhile, the central control unit 120 checks and determines whether the PSS 200 appropriately performs operations required for the handover by analyzing various messages, received from the PSS 200 through the serving BS signal analysis unit 132 and the target BS signal analysis unit 133, and data, directly transferred by the PSS 200 through the DM port 220, at respective steps of the call flows shown in FIGS. 5 and 6.

The portable Internet analyzer having a handover test function according to the present invention is not limited to the above-described embodiments, but may be variously modified and then worked within the range of the technical spirit of the present invention. For example, it is to be noted that respective blocks of FIG. 4 have been determined from the point of view of functionality. Furthermore, functions of separately controlling Carrier to Interference Noise Ratio (CINR) or timing offset may be provided inside, in front of or behind the power/frequency adjustment units 114 and 115. The function of controlling CINR is a function of adding or subtracting a desired target noise signal to or from respective frames, and a function of controlling a timing offset is a function of providing a time lag between the DL signal of the serving BS and the DL signal of the target BS, and may be used to provide a time delay between the DL signal of the serving BS and the DL signal of the target BS.

The signal analysis unit of the Portable Internet Analyzer decodes UL Signals using parameters such as DL Cell ID and UL Cell ID of Service Base Station and/or Target Base Station, and executes CRC check which leads to discriminate whether PSS transmits a signal to either Serving BS or Target. Further, the accuracy of the discrimination could be improved based upon the fact that Central Control Unit, controlling handover process, manages the status on transmitting UL signals to which base station.

According to the portable Internet analyzer having a handover test function according to the present invention, a handover test function can be effectively performed on a PSS using a single portable Internet analyzer, and thus the test equipment construction costs can be reduced and the establishment of UL and DL synchronization and integrated control can be very conveniently performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A portable Internet analyzer having a handover test function, comprising:
   a transmission unit for encoding various DownLink (DL) signals of a serving Base Station (BS) or/and a target BS using a preamble index, including a cell Identification (ID) assigned in advance in a form of a unique code in association with a handover test, synthesizing the encoded signals, and sending the synthesized signals to a Portable Subscriber Station (PSS);
   a reception unit for receiving various UpLink (UL) signals from the PSS in association with the handover test, and decoding the UL signals using the cell Parameters of the serving BS or/and target BS;
   a switching unit for selectively switching the transmission unit and the reception unit to the PSS for each of DL and UL sections of each frame; and
   a central control unit for generating various Media Access Control (MAC) messages to be sent to the PSS through the transmission unit in association with the handover test, analyzing handover test-related MAC messages received through the reception unit, and controlling switching operation of the switching unit,
   wherein the transmission unit comprises a serving BS signal generation unit and target BS signal generation unit for implementing a physical layer algorithm, which includes encoding using the preamble indices and is performed in the serving BS and the target BS in association with the handover test, power/frequency adjustment units for separately adjusting power and frequency of the various DL signals output from the serving BS signal generation unit and the target BS signal generation unit, a mixer for mixing the DL signals output from respective power/frequency adjustment units, and a transmission control unit for implementing an algorithm of a MAC layer, which is a relatively upper layer, generating a MAC Protocol Data Unit (MAC PDU), generating an Uplink Channel Descriptor (UCD)/Downlink Channel Descriptor (DCD), including a UL cell ID, and other required messages, transferring the messages to the serving BS signal generation unit and the target BS signal generation unit, and controlling respective power/frequency adjustment units.

2. The portable Internet analyzer as set forth in claim 1, wherein the transmission unit is further provided with a function of separately controlling Carrier to Interference Noise Ratios (CINRs) of various DL signals output from the serving BS signal generation unit and the target BS signal generation unit.

3. The portable Internet analyzer as set forth in claim 1, wherein the transmission unit is further provided with a function of separately controlling timing offsets between various DL signals output from the serving BS signal generation unit and the target BS signal generation unit.

4. The portable Internet analyzer as set forth in claim 1, wherein the serving BS signal generation unit and the target BS signal generation unit are implemented using Field Programmable Gate Arrays (FPGAs) or Digital Signal Processors (DSPs).

5. The portable Internet analyzer as set forth in claim 4, wherein the transmission control unit is implemented using a DSP.

6. The portable Internet analyzer as set forth in claim 5, wherein the reception unit comprises a serving BS signal analysis unit and target BS signal analysis unit for receiving various types of UL signals from the PSS and decoding the received UL signals using cell Parameters assigned to the serving BS signal generation unit and the target BS signal generation unit, and a reception control unit for controlling operation of the serving BS signal analysis unit and the target BS signal analysis unit and transferring the signals, decoded by the serving BS signal analysis unit and the target BS signal analysis unit, to the central control unit.

7. The portable Internet analyzer as set forth in claim 6, wherein the central control unit is implemented using a typical personal computer, maintains synchronization between the transmission unit and the reception unit while bidirectionally communicating with the transmission control unit of the transmission unit and the reception control unit of the reception unit, performs a backbone function for the serving BS signal generation unit, the target BS signal generation unit, the serving BS signal analysis unit and the target BS signal analysis unit, generates messages to be sent through the transmission unit, generates UL-MAP information, transfers the UL-MAP information to the transmission unit and the reception unit, provides a user interface, which is configured to receive various handover test-related items set or input by a user, to the user, analyzes results of the decoding, received from the reception unit, and various types of data, received from the PSS, and notifies the user of results of the analysis.

* * * * *